W. L. HESTERLY.
MACHINE FOR CATCHING INSECTS.
APPLICATION FILED JAN. 15, 1915.
1,156,778.
Patented Oct. 12, 1915.
2 SHEETS—SHEET 1.
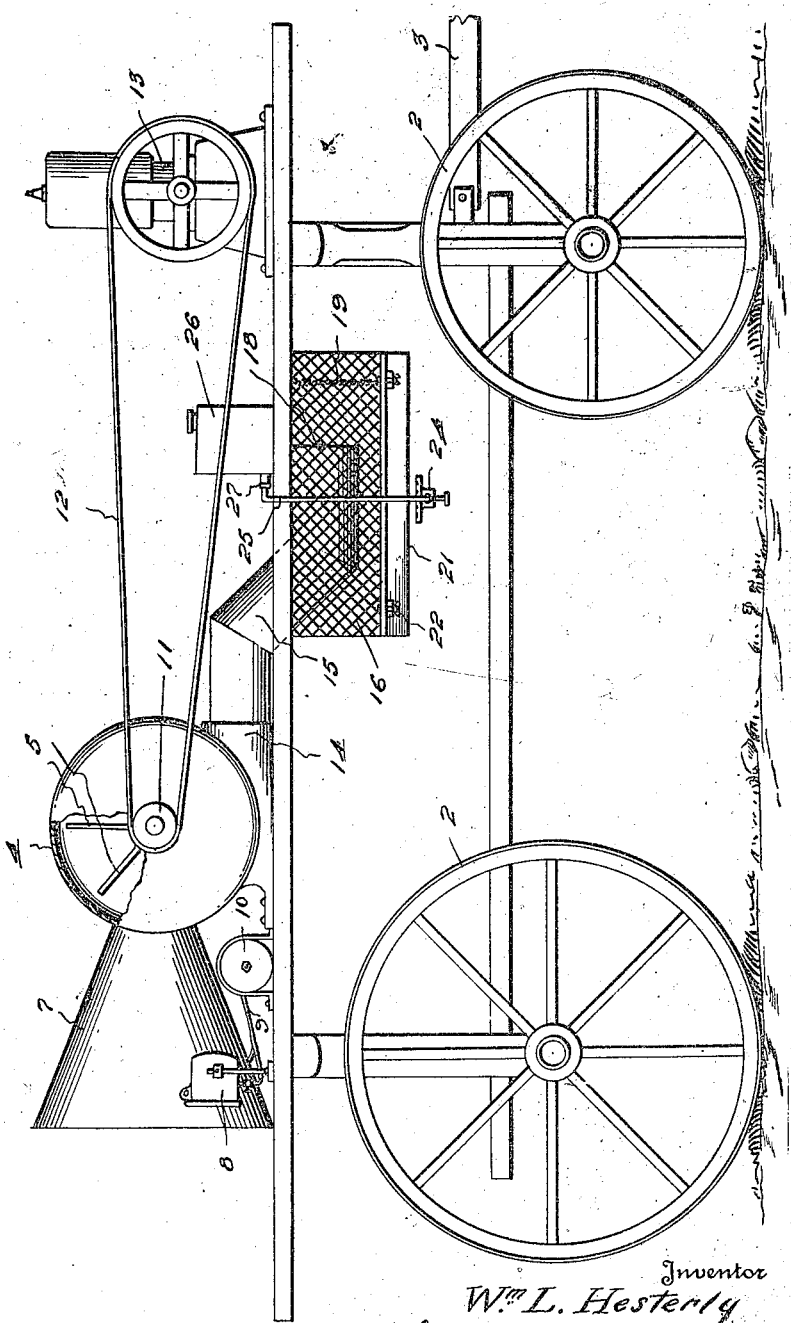
Witnesses
Inventor
Wm L. Hesterly
Attorney

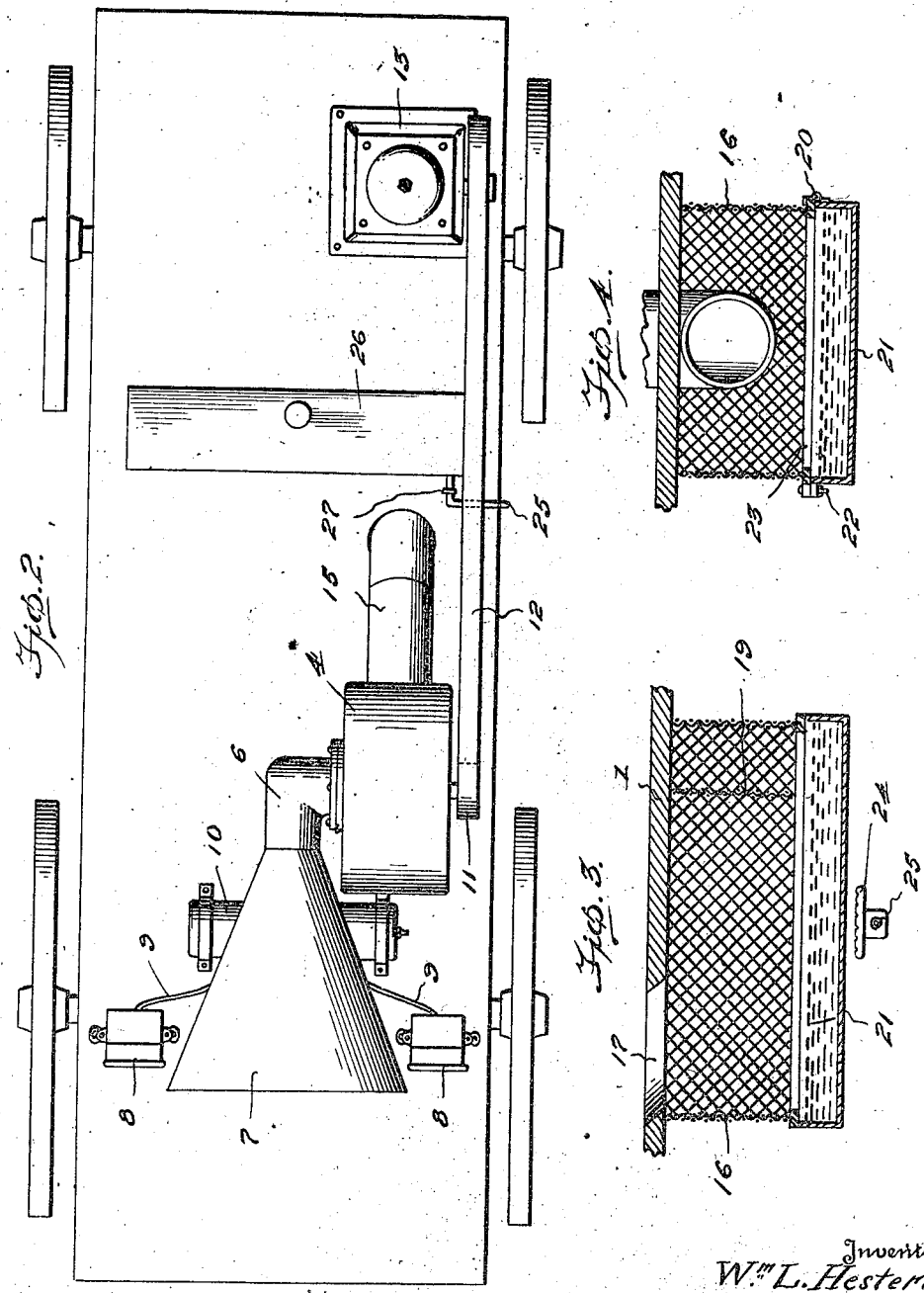

UNITED STATES PATENT OFFICE.

WILLIAM L. HESTERLY, OF MORGAN CITY, LOUISIANA.

MACHINE FOR CATCHING INSECTS.

1,156,778.   Specification of Letters Patent.   Patented Oct. 12, 1915.

Application filed January 15, 1915. Serial No. 2,388.

*To all whom it may concern:*

Be it known that I, WILLIAM L. HESTERLY, a citizen of the United States, residing at Morgan City, in the parish of St. Mary and State of Louisiana, have invented certain new and useful Improvements in Machines for Catching Insects; and I do hereby declare the following to be a full, clear, and exact description of the invention, such as will enable others skilled in the art to which it appertains to make and use the same.

This invention relates to machines for catching insects, such as cane moths, boll weevils, and other destructive insects, and one of the principal objects of the invention is to provide a machine of simple construction to be used during the night time and which will comprise a light or lights to attract the insects and a suction fan and a large flaring intake element to draw the insects in and deposit them in a cage mounted over a tank or container for hot water in which the insects are deposited and destroyed.

The foregoing and other objects and advantages may be attained by means of the construction illustrated in the accompanying drawings, in which—

Figure 1 is a side elevation and partial section of a machine for catching insects made in accordance with this invention. Fig. 2 is a top plan view of the same. Fig. 3 is a longitudinal section of the cage and the water tank, and Fig. 4 is a vertical transverse section of the same.

Referring to the drawings, the numeral 1 designates a wagon bed properly mounted upon wheels 2 and provided with a pair of thills or a wagon tongue 3. Mounted upon the wagon body 1 is a fan casing 4, provided with a suitable fan 5, and connected at one side of the fan casing 4 is an intake pipe 6 having a flaring intake nozzle 7 connected thereto and extending out centrally toward the rear of the wagon body 1. At opposite sides of the intake nozzle 7 are suitable lamps 8 which may be either electric or of other type, and may be provided with fuel tubes 9 leading to the supply tank 10. The fan shaft extends from the opposite side of the casing 4 from the intake pipe 6 and is provided with a suitable pulley 11 connected by means of a belt 12 to a suitable motor 13. The fan 5 is rotated as a suction fan, and the outlet end 14 of the fan casing 4 has connected to it a discharge pipe 15 which leads down through the wagon body 1, and is supported at its upper end upon said wagon body, while the discharge end of the pipe 15 is disposed within a wire cloth cage 16. The wire cloth cage 16 is suitably secured underneath the wagon body 1. The pipe 15 extends through an opening 17 in the wagon body 1, and the discharge end 18 is disposed horizontally, in front of a deflector partition 19 in the cage, said partition being made of strong wire cloth, to receive the impact of the blast and the insects drawn into the machine.

The cage 16 is open at its lower end, and secured by means of a hinge 20 to said cage is a water tank 21, said water tank being connected by means of bolts 22 to the skeleton frame 23 at the bottom of the cage. The bolts 22 may be slightly loosened and slid out of place to permit the water tank 21 to swing on the hinge 20 for discharging its contents whenever desired.

For heating the water in the tank 21, a burner 24 is disposed underneath the tank, and a pipe 25 leads from the burner to a fuel tank 26. The pipe 25 is connected to the tank 26 by a swinging joint 27, so that the burner 24 may be swung out of the way when it is desired to discharge the contents of the tank 21.

The operation of the machine may be briefly described as follows: The machine is drawn over the cane field or over the cotton field at night and the lamps 8 are lighted and the fan is started in motion as the machine is drawn along. The insects are attracted by the light, and after they get any where near the flaring intake element 7, they are drawn in and deposited in the cage and in the tank 21. Cane moths, boll weevils and other insects are readily caught by means of this machine, while the expense of operation is comparatively slight.

Various changes may be made in the details of construction without departing from the spirit and scope of the invention as defined in the claims.

What is claimed is:—

1. In a machine of the character described, the combination with a fan casing, an intake nozzle, lights, and a discharge pipe leading from the fan casing, of a wire cloth cage for receiving the insects, said cage having a deflector partition of heavy wire cloth, and a water tank hinged below the end of said cage, and a burner for heating the water in said tank.

2. In a machine of the character described, the combination of a vehicle body, a fan casing mounted on the vehicle body, an intake pipe connected to the casing, a flaring intake element connected to the pipe, a discharge pipe connected to the casing, a cage in which said pipe discharges, said cage having a water tank hinged to the lower end thereof, and a burner for heating the water in said tank.

In testimony whereof I affix my signature in presence of two witnesses.

WILLIAM L. HESTERLY.

Witnesses:
 FRANK VAUGHAN,
 BURD CLEMENT.